US012220617B1

(12) United States Patent
Wang

(10) Patent No.: US 12,220,617 B1
(45) Date of Patent: Feb. 11, 2025

(54) RECHARGEABLE LUMINOUS BALL

(71) Applicant: Lei Wang, Chuzhou (CN)

(72) Inventor: Lei Wang, Chuzhou (CN)

( * ) Notice: Subject to any disclaimer, the term of this patent is extended or adjusted under 35 U.S.C. 154(b) by 0 days.

(21) Appl. No.: 18/385,727

(22) Filed: Oct. 31, 2023

(51) Int. Cl.
*A63B 43/06* (2006.01)
*F21V 33/00* (2006.01)

(52) U.S. Cl.
CPC ............ *A63B 43/06* (2013.01); *F21V 33/008* (2013.01); *A63B 2225/74* (2020.08)

(58) Field of Classification Search
CPC .... A63B 43/06; A63B 2225/74; F21V 33/008
See application file for complete search history.

(56) References Cited

U.S. PATENT DOCUMENTS 4,577,865 A * 3/1986 Shishido ................ A63B 43/00 473/570
4,595,200 A * 6/1986 Shishido ................ A63B 43/00 473/570
5,228,686 A * 7/1993 Maleyko ................ A63B 43/06 273/DIG. 8
5,236,383 A * 8/1993 Connelly ............... A63B 43/06 473/576
5,375,839 A * 12/1994 Pagani ................... A63B 43/00 473/570
10,076,685 B2 * 9/2018 King ....................... H02J 50/90
11,266,883 B2 * 3/2022 Lanni ................... A63B 43/004
11,559,725 B1 * 1/2023 Ayal ....................... A63B 43/06
2012/0244969 A1 * 9/2012 Binder .................... G01P 15/18 473/570
2017/0100678 A1 * 4/2017 Larson ................... A63B 41/00
2024/0238650 A1 * 7/2024 Roberts .............. A63B 24/0003

FOREIGN PATENT DOCUMENTS

CN 105597284 A * 5/2016
CN 116585677 A * 8/2023
GB 2591216 A * 7/2021 ......... A63B 24/0021

* cited by examiner

*Primary Examiner* — Steven B Wong
(74) *Attorney, Agent, or Firm* — Birchwood IP

(57) ABSTRACT

The present disclosure discloses a rechargeable luminous ball, which includes a ball providing with several cavities; a luminous component including a luminous body, an interior of the luminous body is provided with a battery, the luminous body is provided with a lamp bead and a charge port; and a first cover cap providing with a luminous component fix groove, the luminous component is interference-fit with the luminous component fix groove. Besides, the first cover cap is provided with an opening, the opening is interference-fit with a second cover cap, the charge port is located below the opening; the first cover cap can be detachably connected to the cavity. When the first cover cap is installed in the cavity, the first cover cap is interference-fit with an inner wall of the cavity.

5 Claims, 3 Drawing Sheets

RECHARGEABLE LUMINOUS BALL

TECHNICAL FIELD

The present disclosure relates to the technology field of rechargeable luminous balls, and in particular, to a rechargeable luminous ball.

BACKGROUND

There are many types of ball games that have always been loved by many sports enthusiasts. They not only exercise the body but also cultivate interactive relationships between people. Generally, the design of a ball is mostly oriented towards an appearance or an elastic function, with few other functional designs. Therefore, the appearance of commercially available ball games is roughly the same.

There are luminous balls available on the market, which generally use regular replacement battery or wireless charging to power and emit light from a luminous component, or use fluorescent powder to emit light from the ball. In which, the wireless charging generally sets a wireless charging board inside the ball and charges batteries inside the luminous component through wireless charging. The efficiency of wireless charging is low, the cost of replacing damaged luminous component is high; and it needs to be replaced regularly.

SUMMARY

The technical solution adopted by the present disclosure to solve the above problems is as follows.

The present disclosure provides a rechargeable luminous ball including:

- a ball, where the ball is provided with several cavities;
- a luminous component, where the luminous component includes a luminous body, an interior of the luminous body is provided with a battery, and the luminous body is provided with a lamp bead and a charge port;
- a first cover cap, where the first cover cap is provided with a luminous component fix groove, the luminous component is interference-fit with the luminous component fix groove; the first cover cap is provided with an opening, the opening is interference-fit with a second cover cap, and the charge port is located below the opening;
- where the first cover cap is detachably connected to the cavity, when the first cover cap is installed in the cavity, the first cover cap is interference-fit with an inner wall of the cavity.

In an embodiment of the present disclosure, one end of the second cover cap is fixedly connected to one side of the opening, and the other end of the second cover cap is provided with a groove, one side of the opening far away a fix end of the second cover cap is provided with a notch.

In an embodiment of the present disclosure, the luminous body is provided with an insulation piece socket, and the insulation piece socket is provided with an insulation piece.

In an embodiment of the present disclosure, the battery is a lithium battery, the charge port is a USB charge port or Type-c charge port, and the lamp bead is an LED lamp bead.

In an embodiment of the present disclosure, the number of luminous components is 2 groups, and the luminous components are distributed on the ball.

In an embodiment of the present disclosure, the ball is composed of an exodermis, an interlayer, a yarn layer, and an inner liner layer from the outside to the inside; the first cover cap is attached to edges of the exodermis, the interlayer, the yarn layer, and the inner liner layer.

The beneficial effect of the present disclosure is that the technical solution provides a rechargeable luminous ball, which includes a ball, a luminous component, and a first cover cap. The ball is provided with several cavities, and the luminous component includes a luminous body. The interior of the luminous body is provided with a battery, and the luminous body is provided with a lamp bead and a charge port. The first cover cap is provided with a luminous component fix groove, the luminous component is interference-fit with the luminous component fix groove. And the first cover cap is provided with an opening, the opening is interference-fit with a second cover cap, the charge port is located below the opening. The first cover cap can be detachably connected to the cavity. When the first cover cap is installed in the cavity, the first cover cap is interference-fit with an inner wall of the cavity. Where, the luminous component can be wired for charging through the charge port with high charging efficiency. The first cover cap can seal the cavity to prevent external environment from affecting the luminous component. The present disclosure has a compact structure, high charging efficiency, convenient charging, wide charging range, and low usage cost.

BRIEF DESCRIPTION OF DRAWINGS

In order to provide a clearer explanation of the embodiments of the present disclosure or the technical solutions in the prior art, a brief introduction will be given to the drawings required in the embodiments or the prior art. It is obvious that the drawings in the following description are only some embodiments of the present disclosure. For ordinary technical personnel in this art, other drawings can also be obtained based on the structures shown in these drawings without any creative work.

Figure 1:
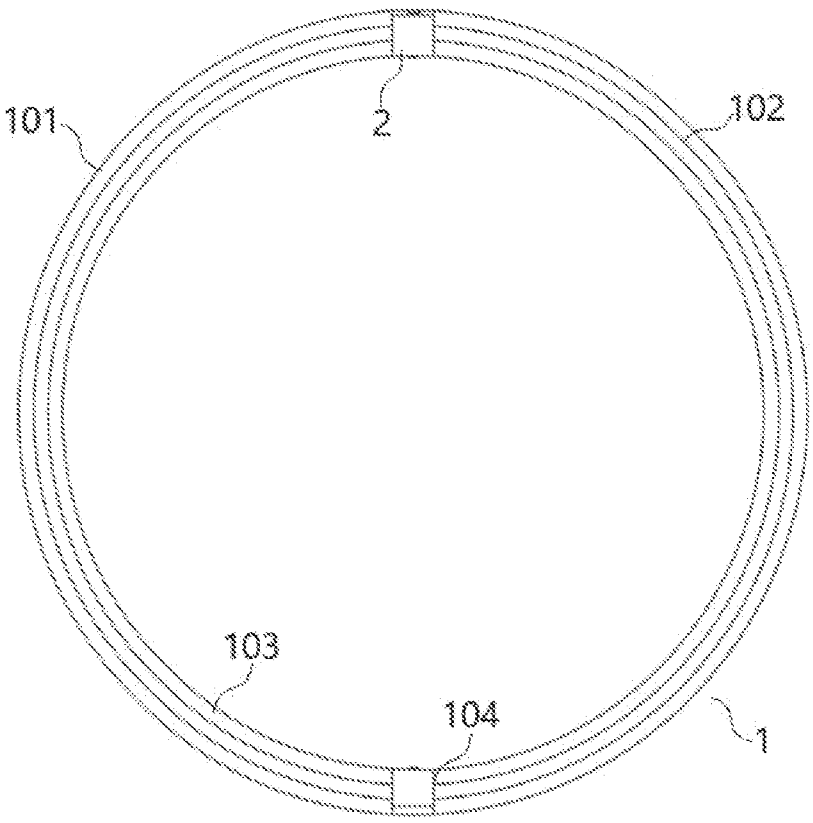
FIG. 1 is a structural schematic diagram of a rechargeable luminous ball of the present disclosure.

Reference numeral: 1-Ball, 101-Exodermis, 102-Interlayer, 103-Inner liner layer, 104-Cavity, 2-Luminous component, 201-Luminous body, 202-Lamp bead, 203-Insulation piece socket, 204-Charge port, 3-First cover cap, 301-Second cover cap, 302-Groove, 303-Notch, 304-Opening, 4-Luminous component fix groove.

DESCRIPTION OF EMBODIMENTS

In order to enable those skilled in the art to better understand the technical solution of the present application, the following will provide a clear and complete description of the technical solution in the embodiments of the present application in combination with the drawings. Obviously, the described embodiments are only a part of the embodiments of the present application, not all of them. Based on the embodiments in the present disclosure, all other embodiments obtained by those skilled in the art without creative work fall within the protection scope of the present application.

Figure 2:
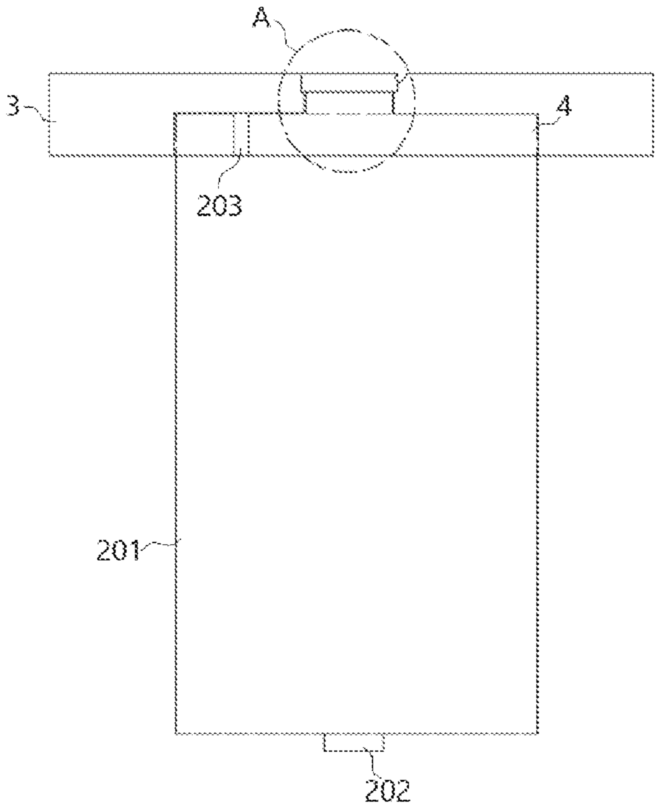
FIG. 2 is a structural schematic diagram of a luminous component in the rechargeable luminous ball of the present disclosure.
Figure 3:
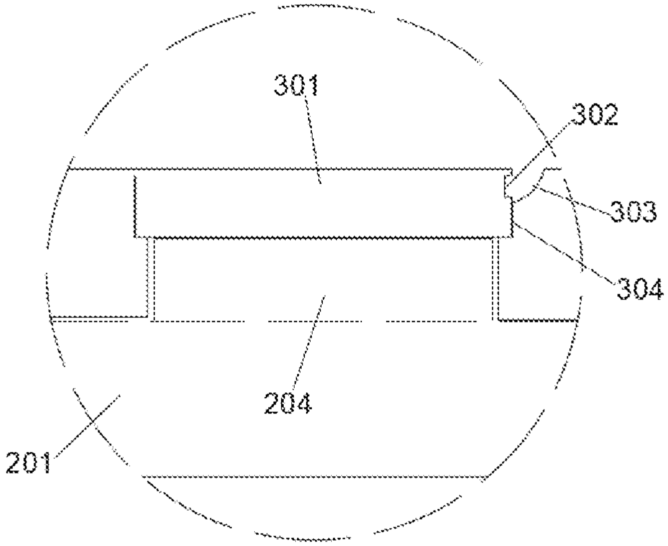
FIG. 3 is an enlarged view of position A in FIG. 2.

As shown in FIGS. 1-3 of the description, a rechargeable luminous ball includes a ball 1, a luminous component 2, and a first cover cap 3. The ball 1 is provided with several cavities 104, the luminous component 2 includes a luminous body 201, an interior of the luminous body 201 is provided with a battery, the luminous body 201 is provided with a lamp bead 202, and a charge port 204. The first cover cap 3 is provided with a luminous component fix groove 4, the luminous component 2 is interference-fit with the luminous component fix groove 4. And the first cover cap 3 is provided with an opening 304, the opening 304 is interference-fit with a second cover cap 301 to prevent liquid from flowing into a gap between the second cover cap 301 and the opening 304; thus, ensuring a certain degree of waterproofing of the second cover cap 301. The charge port 204 is located below the opening 304. The first cover cap 3 can be detachably connected to the cavity 104. When the first cover cap 3 is installed in the cavity 104, the first cover cap 3 is interference-fit with an inner wall of the cavity 104. Where, the luminous component 2 can be wired for charging through the charge port 204 with high charging efficiency. The first cover cap 3 can seal the cavity 104 to prevent external environment from affecting the luminous component 2. The present disclosure has a compact structure, a high charging efficiency, a convenient charging, a wide charging range, and a low usage cost.

As a preferred implementation mode of this embodiment, one end of the second cover cap 301 is fixedly connected to one side of the opening 304, and the other end of the second cover cap 301 is provided with a groove 302. One side of the opening 304 far from a fix end of the second cover cap 301 is provided with a notch 303, which can be directly connected to the charge port 204 by opening the second cover cap 301. The notch 303 facilitates an insertion of fingers into the gap between the opening 304 and the second cover cap 301, and the fingers are tightly clamped in the groove 302 to facilitate the opening of the second cover cap 301. In addition, a contact surface between the second cover cap 301 and the charge port 204 is provided with a fix cavity. When the second cover cap 301 covers the opening 304, the charge port 204 is located in the fix cavity, which can fix the charge port 204.

Specifically, the luminous body 201 is provided with an insulation piece socket 203, and an insulation piece is installed inside the insulation piece socket 203. The opening or closing of the lamp bead 202 can be controlled by whether the insulation piece is inserted into the insulation piece socket 203.

Specifically, the battery is a lithium battery, the charge port 204 is a USB charge port or Type-c charge port, and the lamp bead 202 is an LED lamp bead.

Specifically, the number of said luminous component 2 is 2 groups, and the luminous components 2 are distributed on the ball 1, which ensures that the ball emits more evenly.

In addition, the ball 1 is composed of an exodermis 101, an interlayer 102, a yarn layer, and an inner liner layer 103 from the outside to the inside. The first cover cap 3 is attached to edges of the exodermis 101, the interlayer 102, the yarn layer, and the inner liner layer 103, ensuring the depth of the contact between the first cover cap 3 and one side of the cavity 104, further ensuring the sealing of the first cover cap 3 to the cavity 104.

From the above description, it can be seen that the above embodiments of the present disclosure achieve the following technical effects.

The beneficial effect of the present disclosure is that the technical solution provides a rechargeable luminous ball, which includes a ball, a luminous component, and a first cover cap. The ball is provided with several cavities, and the luminous component includes a luminous body. The interior of the luminous body is provided with a battery, and the luminous body is provided with a lamp bead and a charge port. The first cover cap is provided with a luminous component fix groove, the luminous component is interference-fit with the luminous component fix groove. In additional, the first cover cap is provided with an opening, the opening is interference-fit with the second cover cap, and the charge port is located below the opening. The first cover cap can be detachably connected to the cavity. When the first cover cap is installed in the cavity, the first cover cap is interference-fit with the inner wall of the cavity. Where, the luminous component can be wired for charging through the charge port with high charging efficiency. The first cover cap can seal the cavity to prevent external environment from affecting the luminous component. The present disclosure has a compact structure, high charging efficiency, convenient charging, wide charging range, and low usage cost.

It should be noted that terms used here are only for describing specific embodiments, and are not intended to limit the exemplary embodiments according to the present application. As used here, unless the context explicitly indicates otherwise, the singular form is also intended to include the plural form. In addition, it should be understood that when the terms “including” and/or “comprising” are used in this description, they indicate the presence of features, steps, operations, devices, components, and/or combinations of them.

Unless otherwise specified, the relative arrangement, numerical expressions, and numerical values of the components and steps described in these embodiments do not limit the scope of the present application. At the same time, it should be understood that for a convenience of description, the dimensions of each part shown in the drawings are not drawn according to the actual proportional relationship. The techniques, methods, and equipment known to ordinary technical personnel in the relevant field may not be discussed in detail, but in appropriate cases, the said techniques, methods, and equipment should be considered as a part of the description. In all the examples shown and discussed here, any specific values should be interpreted as merely illustrative and not as limiting. Therefore, other examples of exemplary embodiments may have different values. It should be noted that similar labels and letters represent similar terms in the following drawings, so once an item is defined in one drawing, it does not need to be further discussed in subsequent drawings.

In the description of the present application, it should be understood that the orientation or positional relationship indicated by directional words such as “front”, “back”, “up”, “down”, “left”, “right”, “horizontal”, “longitudinal”, “vertical”, “plane”, “top”, and “bottom” are usually based on the orientation or positional relationship shown in the drawings, only for the convenience of describing the present application and simplifying the description. In the absence of contrary explanations, these directional terms do not indicate or imply that the device or component referred to must have a specific orientation or be constructed and operated in a specific orientation, and therefore cannot be understood as limiting the protection scope of the present application. In addition, the directional words “inner” and “outer” refer to the inner and outer contours relative to each component itself.

It should be understood that when a component is referred to as “on” or “connected to” another component, it can be directly connected to or on other component, or indirectly connected with an inserted component between the two. On the contrary, when a component is referred to as “directly” on or directly connected to another component, there is no inserted component between the two.

In addition, it should be noted that in the description of the present disclosure, the use of words such as "first" and "second" to define components is only for the purpose of distinguishing the corresponding components. If not otherwise stated, the above words have no special meaning and cannot be understood as limiting the protection scope of the present application. In the description of the present disclosure, unless otherwise stated, the meaning of "multiple" refers to two or more.

The above are the preferred embodiments of the present disclosure. It should be pointed out that for ordinary technical personnel in this art, several improvements and embellishments can be made without departing from the principles of the present disclosure. These improvements and embellishments are also considered as the protection scope of the present disclosure.

What is claimed is:

1. A rechargeable luminous ball, comprising:

a ball, wherein the ball is provided with a plurality of cavities;

a luminous component, wherein the luminous component comprises a luminous body, an interior of the luminous body is provided with a battery, and the luminous body is provided with a lamp bead and a charge port;

a first cover cap, wherein the first cover cap is provided with a luminous component fix groove, the luminous component is interference-fit with the luminous component fix groove; the first cover cap is provided with an opening, the opening is interference-fit with a second cover cap, and the charge port is located below the opening;

wherein, the first cover cap is detachably connected to the cavity, when the first cover cap is installed in the cavity, the first cover cap is interference-fit with an inner wall of the cavity;

wherein the ball is composed of an exodermis, an interlayer, a yarn layer, and an inner liner layer from an outside to an inside; the first cover cap is attached to edges of the exodermis, the interlayer, the yarn layer, and the inner liner layer.

2. The rechargeable luminous ball according to claim 1, wherein one end of the second cover cap is fixedly connected to one side of the opening, and the other end of the second cover cap is provided with a groove; wherein, one side of the opening far away from a fix end of the second cover cap is provided with a notch.

3. The rechargeable luminous ball according to claim 2, wherein the luminous body is provided with an insulation piece socket, and the insulation piece socket is provided with an insulation piece.

4. The rechargeable luminous ball according to claim 3, wherein the battery is a lithium battery, the charge port is a USB charge port or Type-c charge port, and the lamp bead is an LED lamp bead.

5. The rechargeable luminous ball according to claim 4, wherein the number of luminous components is 2 groups, and the luminous components are distributed on the ball.

* * * * *